though its use in pipes, etc.

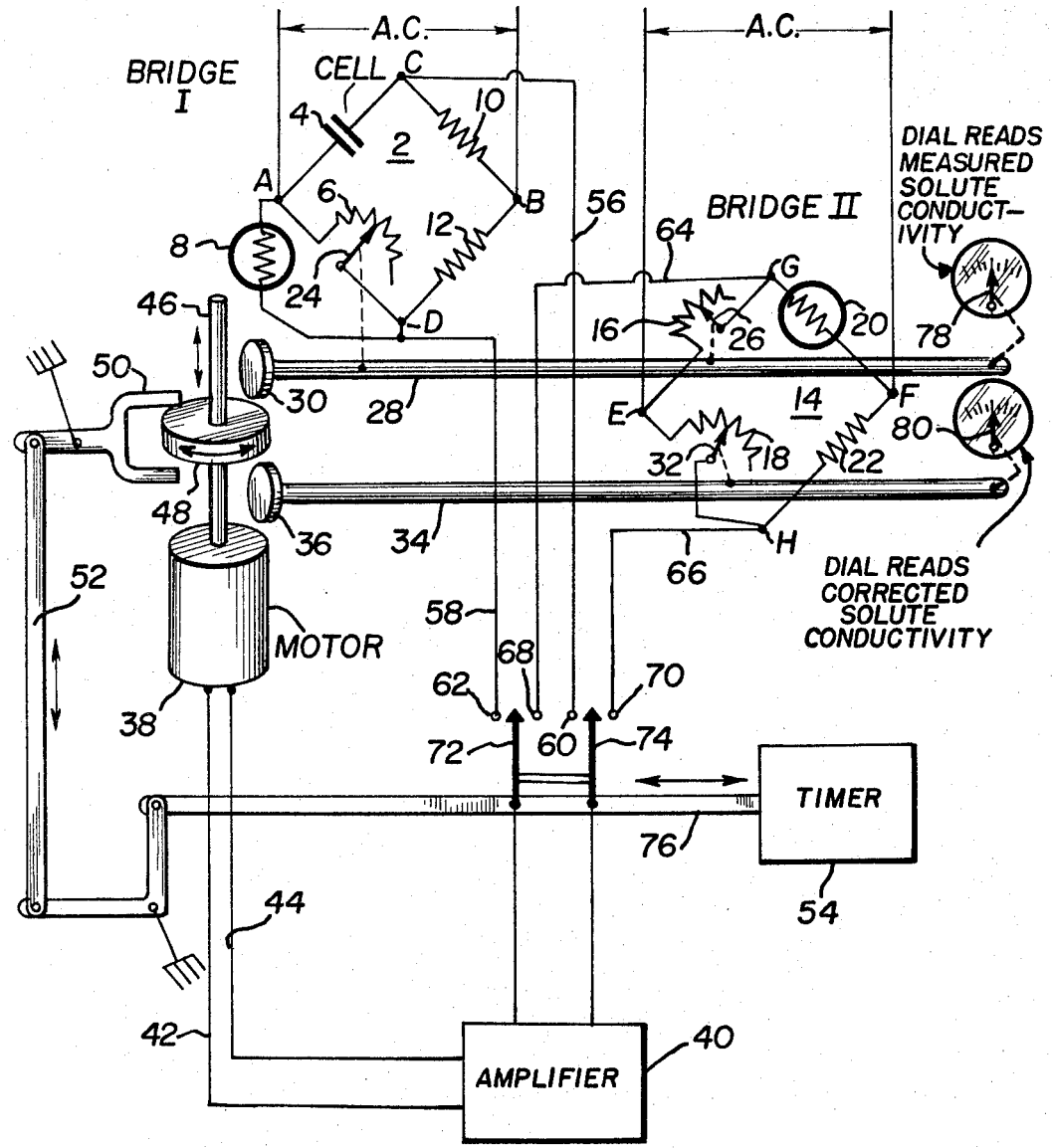

United States Patent Office 3,382,430
Patented May 7, 1968

3,382,430
DOUBLE BRIDGE APPARATUS FOR DETERMINING ELECTROLYTIC CONDUCTIVITY
Leo C. Cunniff, Cedar Grove, and Robert Rosenthal, Tenafly, N.J., assignors, by mesne assignments, to Beckman Instruments, Inc., Fullerton, Calif., a corporation of California
Filed July 26, 1965, Ser. No. 474,638
8 Claims. (Cl. 324—30)

This invention relates to an improved apparatus for measuring electrolytic conductivity and, more particularly, to apparatus for measuring the conductivity of the solute portion of a solution, with automatic compensation for the conductivity of the solvent and additional automatic compensation for changes in the conductivity of both solvent and solute with changes of temperature.

Electrolytic conductivity methods have previously been widely used for rapid measurement of the solute content of solutions. As compared to other methods of quantitative analysis of solutions, such as standard gravimetric and colorimetric methods, for example, electrolytic conductivity methods offer advantages of speed, reliability, and the use of apparatus which can be operated by relatively unskilled personnel. However, difficulties have arisen in these previously used electrolytic conductivity methods when dilute solutions were to be analyzed. This was due to the fact that most previously used methods and apparatus did not take into consideration the conductivity of the solvent itself. Most commonly used solvents, such as water, have extremely low conductivities in the pure state because their ionization constants are very low. The ionization constants are, in fact, so low that if there is a substantial amount of solute present, the conductivity of the solvent, being extremely low compared to that of the solute, can be neglected. But when dilute solutions are being analyzed, the conductivity of the solvent may become an appreciable factor, and, in order for accurate results to be obtained, this background conductivity must be taken into consideration.

Another factor that must be considered in conductometric methods of measuring solute content of solutions is the change in conductivity of both solvent and ionized solute with change of temperature. The conductivities of most ionized solutes and of most solvents change appreciably with change of temperature, and each substance has its own particular temperature-conductivity coefficient. Of course, one way to eliminate the effects of temperature changes in electrolytic methods of analysis is to provide means for maintaining the temperature constant. But this introduces thermostats and other temperature controls which may add considerably to cost of apparatus and of maintenance. It also prohibits use in pipes, etc.

An object of the present invention is to provide improved apparatus for measuring the electrolytic conductivity of the solute portion of a solution wherein provision is automatically made for compensation of the effects of solvent conductivity and for changes in conductivities of both solvent and solute due to changes of temperature.

Another object of the invention is to provide improved apparatus for measuring the electrical conductivity of the solute portion of a solution, in which substantially no errors are introduced because of temperature changes that normally occur during the measuring process.

A further object of the invention is to provide improved electrolytic conductivity measuring apparatus that lends itself readily to accurate and rapid analysis of dilute solutions.

These and other objects will be more readily apparent and the invention will be further understood from the following detailed description and with reference to the drawing, the single figure of which is a schematic representation of a double bridge circuit together with appropriate switching and indicating means for measuring solute conductivity in accordance with the present invention.

As illustrated in the drawing, the apparatus may comprise two bridge circuits balanced alternately by a switching mechanism which includes an electro-mechanical clutch. The circuits portion comprises a first A-C bridge circuit 2, one-half of which comprises a conductivity cell 4 in one arm thereof and a variable resistance 6 in the other arm thereof having in parallel with it a temperature-sensitive resistance element 8. The temperature-sensitive element 8 should have the same temperature coefficient of resistance as the solvent which is to be used. If water is the solvent and sodium chloride is the solute being measured, the temperature-sensitive element 8 may be a semiconductor device with a large negative temperature coefficient modified by a resistive network.

The other half of the bridge circuit 2 may comprise two fixed resistors 10 and 12 in the arms thereof having a fixed resistance ratio of approximately 1000 to 1. One side of the conductivity cell 4 and one end of the variable resistance 6 and of the temperature-sensitive element 8 are connected together at a point A and one end of each of the other two resistances 10 and 12 are connected together at a point B. The other end of resistance 10 is connected to the other side of the conductivity cell 4 at point C and the other end of resistance 12 is connected to the variable resistance at the point D. One diagonal of the bridge is therefore constituted by points AB and the other diagonal of the bridge is constituted by points CD. A source of low voltage A-C, such as a battery-operated oscillator is connected across the diagonal AB. The A-C frequency may be anything from about 50 c.p.s. to about 10,000 c.p.s. and the voltage should be low enough to keep the cell current desirably low so that the cell does not overheat. The amount of current allowable depends upon the cell constant, the amount of solution in the cell, the current density, etc. As a general rule, the bridge supply voltage should be limited so that not more than about 10 volts appears across the conductivity cell.

The apparatus also includes a second bridge circuit 14, one-half of which comprises two variable resistors 16 and 18 as arms thereof and which are connected together at a point E and the other half of which comprises a temperature-sensitive resistance element 20 and a fixed resistor 22 as other arms thereof and which are connected together at a point F. The temperature-sensitive element 20 should have the same temperature coefficient of resistance as the solute. The variable resistance 16 and the temperature-sensitive element 20 are also connected together at a point G and the variable resistance 18 and fixed resistance 22 are connected together at a point H. Points or terminals EF therefore constitute a diagonal of the second bridge 14, and points or terminals GH constitute the other diagonal of bridge 14. A low voltage A-C source, such as a battery-operated oscillator (or low voltage tap on secondary of a transformer) is connected across the diagonal EF.

The variable resistance 6 of the first bridge 2 has a sliding contact 24 and the variable resistance 16 of the second bridge 14 has a sliding contact 26. Both of the sliding contacts 24 and 26 are connected, from a mechanical standpoint only, to the same rotatable shaft 28 having on one end thereof a drive means 30. The drive means 30 may, for example, be a gear or a roller having a friction surface.

The other variable resistance 18 of the second bridge 14 has a sliding contact means 32 connected, from a mechanical standpoint only, to a second rotatable shaft 34 having on one end thereof a drive means 36 like the drive means 30.

The two shafts 28 and 34 are alternately driven from a single servo system which may comprise a reversible motor 38 which is responsive to current output of an amplifier 40. The motor 38 and amplifier 40 are connected together electrically by lead wires 42 and 44.

To prevent undue overdrive on these shafts, they may be provided with limit switches (not shown).

The drive system comprises a motor drive shaft 46 carrying clutch disc means 48 moved back and forth on shaft 46 by fork means 50. The fork means 50 is connected through a system of linkages 52 to the output of a timer 54. The arrows adjacent to the shaft 52 and on disc 48 indicate the directions of movement of the respective elements.

The diagonal CD of the first bridge 2 is connected by lead wires 56 and 58 to contact switch terminals 60 and 62 respectively. The diagonal GH of the second bridge 14 is connected by lead wires 64 and 66 to contact switch terminals 68 and 70 respectively.

The contact switch has two uni-controlled armatures, one of which 72 can make contact alternately with contact terminals 62 or 68 and the other of which 74 can make alternate contact with switch contact terminals 60 or 70. The armatures 72 and 74 are connected to amplifier 40 and they are actuated in unison by a member 76 connected to timer 54. The member 76 is a part of linkage system 52.

The apparatus may further include a reading dial and pointer 78 driven by shaft 28 and another reading dial and pointer 80 driven by shaft 34.

The temperature-sensitive elements 8 and 20 may either be resistances encased in an insulating material, such as glass, or they may be thermistors and connected to resistor networks, for example, for modifying the response characteristics of the temperature-sensitive elements. These resistor networks may be located physically within the housing containing the bridge and the oscillator. In order to maintain the temperature-sensitive elements at the same temperature as the solution being measured, they should be in thermal contact with and immersed in the liquid as close to the conductivity cell as conveniently possible.

In the following example of operation, the solvent will be assumed to be ultra-pure water and the solute will be assumed to be sodium chloride, although it will be understood that these are given only by way of example and that any desired combination of solvent and solute can be measured, such as a solution of two salts in which the concentration of one remains constant. The solvent also need not be a single liquid but may be a mixture of liquids. Independently of the solute, the "solvent" system may even include one or more dissolved solids to provide a constant composition that does not react with the "solute."

The conductivity cell may be one having electrodes of platinized platinum and may be selected to have a cell constant of 0.01/cm. Using ultra-pure water, the cell will then have a resistance of 180,000 ohms at 25° C. In the first bridge 2, the resistance ratio of arms CB:DB should be 1000:1. The maximum value of variable resistance 6 should be large in relation to resistance 8.

In the second bridge 14, the resistance of each of the resistors 16, 18, 20 and 22 may be nominal, say 1000 ohms each.

The conductivity cell is first immersed in the pure solvent to which no solute has been added. Resistors 6 is at its maximum value while the bridge is at balance. At the same time, the sliding contacts 26 and 32 of bridge 14 are positioned so that each of the resistors 16 and 18 is at zero resistance, so that in effect the second bridge is also at balance.

The timer 54 is set in motion so that it periodically first connects the switch armatures 72 and 74 to switch contact terminals 62 and 60 respectively and then connects the armatures 72 and 74 to the contact terminals 68 and 70 respectively. When the armatures are connected to terminals 62 and 60, the clutch is operated so that the fork 50 moves the clutch disc 48 upwards thereby engaging it with drive gear 30 on shaft 28.

With only ultra-pure water in the conductivity cell 4, the first bridge 2 is balanced and no current flows through the leads 56 and 58 which are connected to the bridge points C and D, respectively; therefore no current is fed to the motor 38 from amplifier 40 and the clutch disc 48 does not rotate. However, if solute is added to the water, the conductivity characteristic of the water is changed and the resistance of the conductivity cell 4 decreases in proportion to the amount of solute added and the bridge 2 now becomes unbalanced and current flows to the amplifier 40. The amplifier 40 then supplies an amplified current to motor 38 so that it shaft 46 rotates. The disc 48 also rotates, thus rotating the shaft 28, in turn causing the sliding contact 24 to move in a direction to decrease the resistance of variable resistor 6 until the combined resistance of the parallel resistors 6 and 8 is in such ratio to the new resistance of the conductivity cell that bridge balance is restored. And, when the bridge 2 is balanced once more, current stops flowing to amplifier 40 and motor 38 also stops.

When the shaft 28 rotates it mechanically moves pointer 78, and its dial reading is a measure of solute conductivity not compensated for any change of conductivity that may be caused by a change in conductivity of the solute due to change of temperature.

The apparatus of the present invention gives a compensated solute conductivity reading as follows: as shaft 28 rotates, it also causes sliding contact 26 to move on resistor 16 of the second bridge circuit 14, thus increasing the resistance in the bridge arm EG and unbalancing the second bridge. When the timer moves the switch armatures 72 and 74 into contact with switch terminals 68 and 70, bridge terminals G and H are connected to the amplifier 40 and at the same time, the clutch linkage 52 and the fork 50 move the clutch disc 48 downward, so that the disc 48 engages drive gear 36. Current from the unbalanced bridge circuit 14 is fed to amplifier 40 which, in turn, feeds current to motor 38 causing it to operate so that disc 48 rotates and drives gear 36 and shaft 34 in a direction to cause sliding contact 32 to move and connect an amount of resistance in resistor 18 into bridge arm EH until the resistance of arms EH and EG are equal again. When the bridge arms EH and EG are equal, the bridge 14 is again in balance and no current flows to amplifier 40 and motor 38, thus stopping the motor and the rotation of shaft 34. Shaft 34 is mechanically linked to pointer 80. The rotation of this shaft causes pointer 80 to move, and its dial gives a reading which is indicative of solute conductivity compensated for temperature change. Any unbalance of bridge 14 that might otherwise be caused by temperature changes is compensated by temperature-sensitive element 20 and the resistor network to which it may be connected.

Although the invention has been described using a single servo-system, two independently operating servo-systems could also be used. This would eliminate the switching system, timer and clutch.

What is claimed is:
1. Electrical measuring apparatus for measuring the conductivity of the solute portion of a solution compris- ing, in combination, first and second bridges each having a variable resistor in an arm thereof, an element in another arm of said first bridge responsive to a change in a characteristic of said solution for unbalancing said first bridge, means mechanically connecting together said variable resistors and responsive to an unbalance in said first bridge for simultaneously varying said resistors, and movable means coupled to another arm of said second bridge for balancing said second bridge.

2. Electrical measuring apparatus in accordance with claim 1, including a first visual indicator linked to said first mentioned means, for indicating the extent of variation of said resistors, and a second visual indicator linked to said movable means for indicating the extent of movement thereof required to balance said second bridge after variation of said resistors.

3. Electrical measuring apparatus comprising in combination, a first and second bridge, said first bridge having a conductivity cell in one arm thereof for measuring solute concentration and a variable resistor in another arm thereof, said second bridge having a variable resistor in each of two different arms thereof, means mechanically coupling said variable resistor of said first bridge and one of said variable resistors of said second bridge, said means being responsive to unbalance in said first bridge due to addition of some of said solute to said cell, and movable means coupled to the other of said resistors of said second bridge for re-balancing said second bridge in response to unbalance in said second bridge due to a change in the resistance of said one resistor thereof.

4. Apparatus for measuring temperature-compensated conductivity of a solute dissolved in a solvent comprising a first bridge having first and second pairs of opposite terminals, a conductivity cell in a first arm of said bridge, a first temperature-sensitive element having the same temperature coefficient of resistance as said solvent and a first variable resistance connected in parallel in a second arm of said bridge, the maximum resistance of said variable resistance being very large in relation to the resistance of said first temperature-sensitive element, said first variable resistance being variable in response to motion of a first driven member, a second bridge also having first and second pairs of opposite terminals, a second variable resistance connected in one arm of said second bridge, a third variable resistance connected in a second arm of said second bridge, a second temperature-sensitive element connected in a third arm of said second bridge, said second temperature-sensitive element having the same temperature coefficient of resistance as the dissolved solute to be measured, said second variable resistance also being responsive to motion of said first driven member such that motion of said first driven member results in re-balancing said first bridge and unbalancing said second bridge after addition of some of said solute to said solvent has unbalanced said first bridge; a second driven member, said third variable resistance being variable in response to motion of said second driven member, such that said second bridge is re-balanced by a change in said third variable resistance; means to apply an energizing potential to said first pair of opposite terminals of said first bridge, means electrically connecting said second pair of opposite terminals of said first bridge to a first pair of switch terminals, means to apply an energizing potential to said first pair of opposite terminals of said second bridge, means electrically connecting said second pair of opposite terminals of said second bridge to a second pair of switch terminals, a servo system for separately driving said first and second driven members, and means for alternately connecting said first and second pairs of switch terminals to said servo system so that when said first pair of switch terminals is connected to said system said first driven member is actuated, and when said second pair of switch terminals is connected to said system said second driven member is actuated.

5. Apparatus for measuring temperature-compensated conductivity of a solute dissolved in a solvent, comprising a first bridge having a conductivity cell in a first arm thereof, a first temperature-sensitive element having the same temperature coefficient of resistance as said solvent and a first variable resistance connected in parallel in a second arm thereof, a first driven member, a second bridge having second and third variable resistances connected in different arms thereof, a second temperature-sensitive element having the same temperature coefficient of resistance as said dissolved solute connected in another arm of said second bridge, said first driven member being movable in response to current output of said first bridge which results from addition of some of said solute to said cell, said first resistance being variable to re-balance said first bridge in response to motion of said first driven member, said second resistance being variable in response to motion of said first driven member to unbalance said second bridge as said first bridge is re-balanced, a second driven member, said third resistance being variable in response to motion of said second driven member to re-balance said second bridge, and means to separately drive said first and second driven members.

6. Apparatus for measuring temperature-compensated conductivity of a solute dissolved in a solvent, comprising a first bridge having a conductivity cell in a first arm thereof, a first temperature-sensitive element having the same temperature coefficient of resistance as said solvent and a first variable resistance connected in parallel in a second arm thereof, a second bridge having second and third variable resistances connected in different arms thereof, a second temperature-sensitive element having the same temperature coefficient of resistance as said dissolved solute connected in another arm of said second bridge, a first driven member movable in response to current output of said first bridge which results from addition of some of said solute to said cell, said first resistance being variable to re-balance said first bridge in response to motion of said first driven member, said second resistance being variable in response to motion of said first driven member to unbalance said second bridge as said first bridge is re-balanced, a second driven member, said third resistance being variable in response to motion of said second driven member to re-balance said second bridge, means to alternately drive said first and second driven members in response to current output of said first and second bridges respectively, first indicating means linked to said first driven member to give an indication of uncompensated solute conductivity and second indicating means linked to said second driven member to give an indication of compensated solute conductivity.

7. Apparatus according to claim 5 including a timer connected to a switch, motor, and clutch mechanism for alternately driving said first and second driven members in response to current output from said bridges.

8. Apparatus for measuring temperature-compensated conductivity of a solute dissolved in a solvent, comprising a first bridge having a conductivity cell in a first arm thereof, a first temperature-sensitive element having the same temperature coefficient of resistance as said solvent and a first variable resistance connected in parallel in a second arm thereof, said first bridge being unbalanced by addition of some of said solute to said cell, a second bridge having second and third variable resistances connected in different arms thereof, a second temperature-sensitive element having the same temperature coefficient of resistance as said dissolved solute connected in another arm of said second bridge, a first shaft rotatable in response to current output from said first bridge which results from addition of some of said solute to said cell, said first resistance being variable to re-balance said first bridge in response to rotation of said first shaft, said second resistance being variable in response to rotation of said first shaft to unbalance said second bridge as said first bridge is re-balanced, a second rotatable shaft, said third resistance being variable in response to rotation of said second shaft to re-balance said second bridge, a motor and associated drive shaft responsive to current output from each of said bridges separately, a clutch associated with said drive shaft, and a timer for alternately actuating said clutch so that it connects said drive shaft to first one then the other of said rotatable shafts.

References Cited

UNITED STATES PATENTS

| 2,604,267 | 7/1952 | Smith. | |
|---|---|---|---|
| 2,724,918 | 11/1955 | Triman. | |
| 2,949,765 | 8/1960 | Thayer et al. | 324—30 X |

RUDOLPH V. ROLINEC, *Primary Examiner.*

C. F. ROBERTS, *Assistant Examiner.*